United States Patent
Zar

[11] 3,768,035
[45] Oct. 23, 1973

[54] MODULAR AERODYNAMIC LASER WINDOW

[75] Inventor: Jacob L. Zar, North Andover, Mass.

[73] Assignee: Avco Corporation, Cincinnati, Ohio

[22] Filed: Sept. 22, 1972

[21] Appl. No.: 291,215

[52] U.S. Cl. ............................... 331/94.5, 330/4.3
[51] Int. Cl. .............................................. H01s 3/02
[58] Field of Search ..................... 331/94.5; 330/4.3

[56] References Cited
UNITED STATES PATENTS

| | | | |
|---|---|---|---|
| 3,395,331 | 7/1968 | Snitzer | 331/94.5 |
| 3,617,928 | 11/1971 | Hausmann | 331/94.5 |
| 3,654,569 | 4/1972 | Hausmann | 331/94.5 |
| 3,665,336 | 5/1972 | McLafferty | 331/94.5 |

*Primary Examiner*—William L. Sikes
*Attorney*—Charles M. Hogan et al.

[57] ABSTRACT

The aerodynamic window for a high-powered laser is constructed of an outer sleeve telescoped into an opening in line with the output laser beam generated within a laser chamber. A series of spaced water-cooled discs with central aligned openings are supported inside the outer housing by an inner housing. The inner housing is removably connected to the end of the outer housing that is outside of the laser chamber. The outer housing is adjustably positioned relative to the opening in the laser chamber to enable the output laser beam to be focused correctly in the aligned openings in the discs. Once this position is established the inner housing, along with the series of discs, can easily be removed as a module. The spaces between the housings and between the discs are suitably evacuated to permit maintenance of a subatmospheric pressure within the laser chamber.

11 Claims, 3 Drawing Figures

PATENTED OCT 23 1973 3,768,035
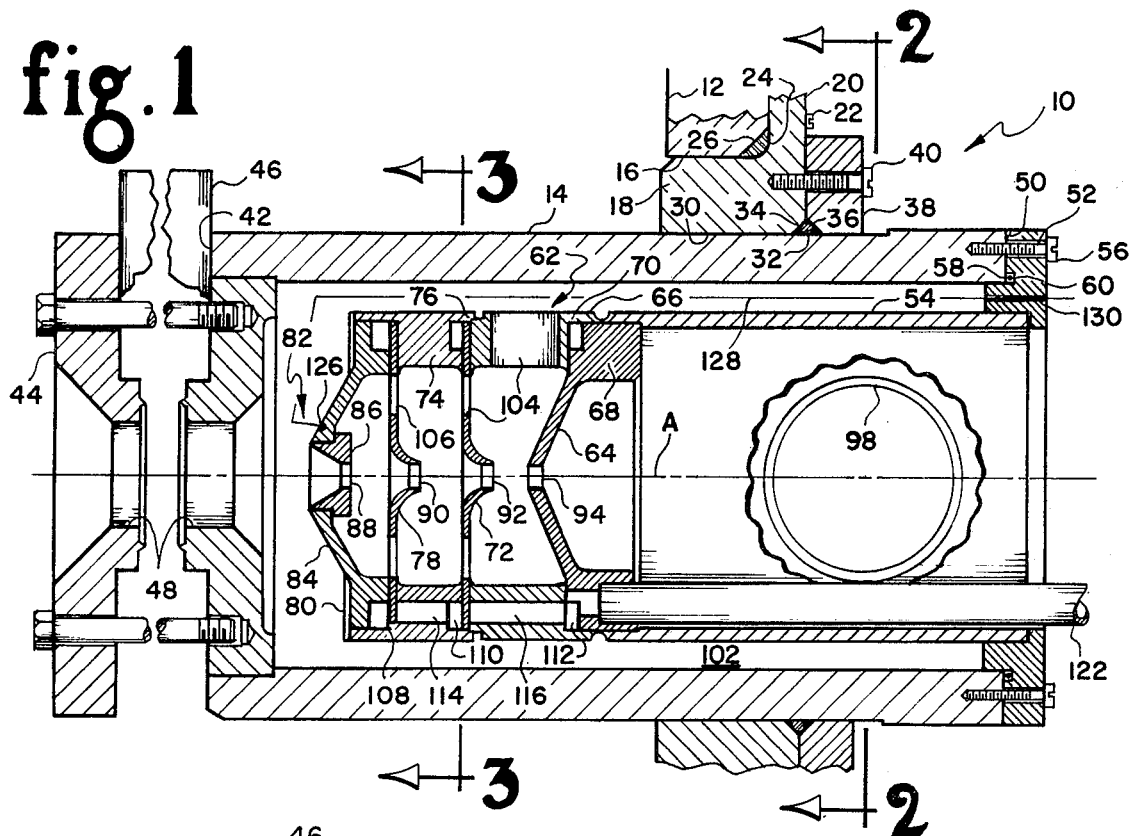
fig. 1
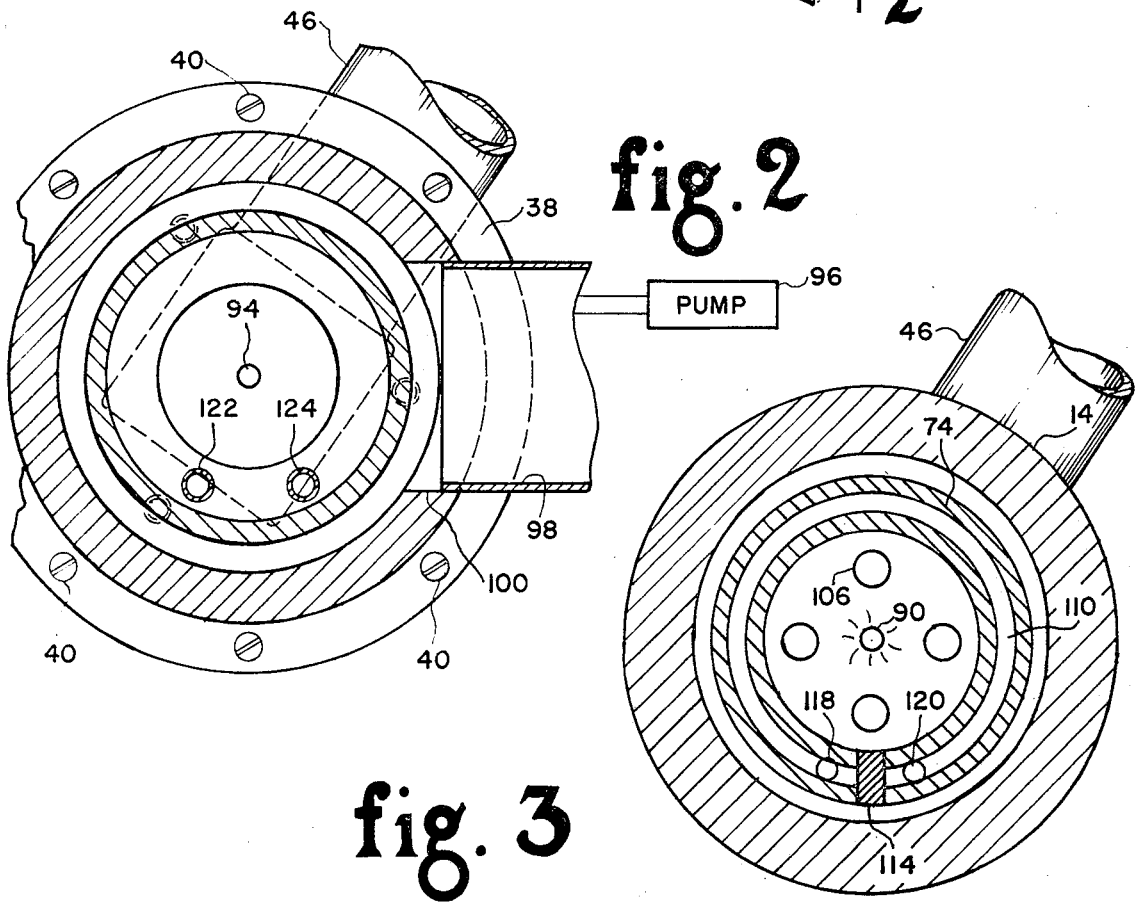
fig. 2
fig. 3

MODULAR AERODYNAMIC LASER WINDOW

The present invention relates to high-power lasers and more specifically to aerodynamic windows used in connection with this type of laser.

Recently developed high-power gas lasers incorporate aerodynamic windows which permit the output laser beam to pass out of a laser chamber maintained at a subatmospheric level without passing through a transparent window which would burn up from the high energy of the beam. This type of window is described in detail in patent application Ser. No. 249,607, entitled "Aerodynamic Laser Window," in the name of Ethan D. Hoag et al, filed on May 2, 1972 and of common assignment with the present invention. Briefly, this window consists of a series of discs having aligned openings through which the laser beam passes. The spaces between the discs are exhausted by a pump so that the resultant gas flow is from the atmosphere and from the interior of the laser cavity to the evacuating pump. Thus, the high-power laser beam passes to the exterior of the laser chamber through the openings but the laser chamber is still maintained at a subatmospheric level.

This type of window represents a significant advance in the high-powered gas laser art. However, recent developments have complicated the construction of this type of window. One of the problems is that the discs are subjected to an extremely high level of heat, thus necessitating a provision for cooling. This makes it necessary to provide intricate cooling passages and to carry coolant to and from the series of discs. In another development it has been proposed that the laser reflecting mirrors be automatically positioned in response to distribution of heat in the nozzle system as sensed by thermocouples. This advance is found in the copending application to J. L. Zar, entitled "Laser Mirror Positioning Apparatus," Ser. No. 286,724, filed on Sept. 6, 1972 and of common assignment with the present invention. This advance adds still another complication to the structure of an aerodynamic window due to the thermocouple wires that must extend to a remote indicating device or control system.

Frequently this type of window must be inspected or replaced by Lucite or salt blocks to determine the light patterns of the laser output beam. This has necessitated a rather lengthy and complicated disassembly of the aerodynamic window. Furthermore, the position of the point of convergence of the laser beam within the discs is extremely important and any disassembly of the window could result in misalignment which must be rectified.

Therefore it is an object of the present invention to provide an aerodynamic window assembly for a high-power laser which has a high degree of accessibility without disturbing the precise position of the window.

These ends are achieved by an aerodynamic window which incorporates an elongated sleevelike outer housing received in an opening in a laser chamber through which an output laser beam passes. The outer housing has a first end within the chamber and a second end outside of the chamber. The outer housing is adjustably longitudinally positioned relative to said opening. An inner housing telescoped into the outer housing mounts an optical communication system at one end and is detachably mounted to the outer housing at the second end thereof. This permits the optical communication system to be prealigned by longitudinally positioning the outer housing while the optical communication system and the inner housing may be removed as a module.

The above and other related objects and features of the present invention will be apparent from a reading of the description of the disclosure shown in the accompanying drawing and the novelty thereof pointed out in the appended claims.

In the drawing:

FIG. 1 is a longitudinal section view of an aerodynamic window assembly embodying the present invention, along with portions of a high-powered laser with which the window is used;

FIG. 2 is a cross-sectional view of the nozzle assembly taken on line 2—2 of FIG. 1; and FIG. 3 is a cross-sectional view taken on line 3—3 of FIG. 1.

In FIG. 1 there is shown an aerodynamic window assembly, indicated by 10, used in connection with a laser chamber 12 in which a high-powered laser output beam is generated. A detailed description of the generation of this beam is unnecessary for an understanding of the present invention. However, it is sufficient to state that the interior of laser chamber 12 typical is maintained at a subatmospheric level and a laser gas is pumped through the laser chamber at a predetermined pressure and velocity. The laser gas is excited to a lasing state by an electrical discharge maintained through the gas and a laser beam generated in or is directed into a regenerative cavity defined by opposed reflective mirrors. One of the mirrors is angled with respect to the other mirrors so that it directs a portion of the beam ideally along the axis A of the aerodynamic window to the exterior of the laser chamber 12 for appropriate focusing by a reflective optical system. The aerodynamic window assembly 10 has openings, described below, that permit the laser beam to communicate with the exterior of laser chamber 12 but they are so arranged to insure that the interior of laser chamber 12 is maintained at the subatmospheric level.

The aerodynamic window housing 10 comprises a sleevelike outer housing 14 which is telescoped through opening 16 in the laser chamber 12. Outer housing 14 is piloted in opening 16 by a sleeve 18 received in opening 16 and having an integral flange 20 secured to laser chamber 12 by screws 22. A suitable resilient ring 24 is compressed against a beveled surface 26 on laser chamber 12 to form an effective gas seal at that point. Sleeve 18 has an inner diameter 30 which receives sleeve element 14 to guide for longitudinal displacement. A resilient ring 32 slips over outer housing 14 and is sandwiched between a beveled surface 34 on sleeve 30 and a beveled surface 36 on a ring 38 releasably secured to flange 20 by screws 40.

When ring 38 is loosened the resilient ring 32 permits the outer housing 14 to be longitudinally displaced. However, when ring 38 is pulled against flange 20 by screws 40 the resilient ring 32 is compressed against the outer housing 14 by beveled surfaces 34 and 36. This holds the outer housing 14 in a predetermined longitudinal position with respect to the opening 16 and laser chamber 12.

At the end 42 of outer housing 14, located within laser chamber 12, there is mounted a gate valve assembly 44 having a gate (not shown) actuated by a solenoid 46 to selectively open or close ports 48. Ports 48 provide an opening between the interior of laser chamber 12 and the end 42 of the outer housing 14.

The end 50 of outer housing 14 that is located outside of the laser chamber 12 receives a flange element 52 welded to an inner housing 54. Flange 52 is removably secured to end 50 of housing 14 by a series of screws 56. A suitable resilient O-ring 58 is received in an annular groove 60 in flange 52 to form an effective seal between the inner and outer housing.

The inner housing 54 is telescoped inside of the outer housing 14 and mounts at its inner end adjacent the end 42 of the outer housing 14 an optical communication assembly, generally indicated by reference character 62. This assembly 62 comprises a first disc 64 which is exposed on one side to the atmosphere and on the other side to the interior of the assembly 62. Disc 64 has a rim portion 68 secured to inner housing 54, as by welding. A spacer sleeve 70 has lip 66 telescoped over and secured to rim portion 68. A second disc 72 is secured between spacer sleeve 70 and another spacer sleeve 74 which has a lip 66 telescoped over spacer sleeve 70. A third disc 78 is secured between spacer sleeve 74 and an outer rim 80 of a spoked element 82 by suitable welding. Spokes 84 extend from rim element 80 to a central disc 86 of spoked element 82.

The discs 86, 78, 72 and 64 each have central openings 88, 90, 92 and 94, respectively in line with the axis A through the center of the aerodynamic window assembly 10. This permits the passage of the output laser beam to the atmosphere.

A pump, generally indicated by reference character 96, is connected to a conduit 98 secured in an opening 100 in communication with the annular space 102 formed between the inner and outer housings. A series of holes 104 in spacer disc 70 connect the space between discs 72 and 64 to the annular space 102. Thus a primary flow of air from atmosphere via opening 94 and from the interior of the laser chamber via opening 92 and openings 104 passes to annular chamber 102 and then to the vacuum pump 96. Additional gas passes across disc 78 through opening 90 and additional openings 106 to form a preselected pressure differential across the discs which maintains the pressure within laser chamber 12 at a subatmospheric level but still permits the high energy laser beam to pass through the nozzle system.

Since the laser beam has a high energy level, it is necessary to cool the discs. This is accomplished by circumferential grooves 108 in rim 80, 110 in spacer ring 74 and 112 in rim element 68. To enable economical and efficient manufacture, each of the discs in the nozzle system is provided with a radial slot which interrupts the circumferential grooves 108, 110 and 112. These slots are filled with partition plates 114 and 116 which prevents coolant from flowing continuously around the circumference of the grooves. A series of inlet passages 118 and outlet passages 120 are drilled through the discs in communication with the grooves on opposite sides of partition plates 114 and 116. This results in a network of parallel cooling passages almost extending around the circumference of the discs in which they are formed. Grooves 108, 110 and 112 are successively smaller to carry away the smaller amount of heat at that point. These cooling passages receive coolant, such as water, from inlet passages 118 and discharge the coolant to outlet passage 120. Conduits 122 and 124, connected to the end of passages 118 and 120, respectively, provide flow of suitable coolant to and from the assembly 62 from flexible conduits (not shown) connected to the ends of conduits 122 and 124.

The spoked assembly 82 may also be provided with thermocouple junctions 126 (only one of which is shown) which have thermocouple wires 128 extending through annular space 102 and through flange 52 at a suitable sealed connection 130 to connect with an exterior indicating or controlling device, as particularly pointed out in the above-mentioned patent application to J. L. Zar.

When the high-powered laser is initially set up it is necessary to focus the point of convergence of the output laser beam at a predetermined point located along the axis A of the aerodynamic window assembly 10. To do this ring 38 is loosened to permit the outer housing 14 to be slid into or out of hole 16 so that the point of convergence is precisely positioned. Once the outer housing is in position ring 38 is pulled against flange 20 by tightening screws 40 so that resilient ring 32 prevents any movement of outer housing 14 and provides a sealed connection at that point. With the point of convergence established the inner housing 54, along with the assembly 62 of discs and their cooling conduits and thermocouple wires, may be removed simply by removing screws 56 and withdrawing the inner housing 54 from the interior of outer housing 14 to permit inspection and/or repair of the components. It is then possible to place a Lucite block or salt window within housing 14 to determine burn patterns of the laser beam.

When the inner housing 54 is replaced again, the point of convergence is precisely at the preselected point it was before the inner housing was removed. This is a significant advantage since it eliminates the tedious job of positioning the point of convergence each time the aerodynamic window is disassembled. It should be also noted that the outer housing may also be removed by removing screws 122 so that the entire assembly may be removed from laser chamber 12. Since the longitudinal position of the outer housing has already been established and fixed, the assembly can be easily reinstalled without disturbing this precise positioning.

While the preferred embodiment of the present invention has been described, it should be apparent that other modifications may be performed without parting from its spirit and scope.

Accordingly, what is claimed as novel and desired to be secured by letters Patent of the United States is:

1. In a laser system generating an output laser beam within a chamber, an aerodynamic window assembly permitting passage of said laser beam to the exterior of said chamber, said window assembly comprising:

an elongated sleevelike outer housing received in an opening in said laser chamber through which said laser beam passes, said outer housing having a first end within said chamber and a second end outside of said chamber;

means releasably mounted to said laser chamber around said opening for adjustably longitudinally positioning said outer housing relative to said opening;

an inner housing telescoped into said outer housing and having a first and second end respectively adjacent the first and second ends of said outer housing, said inner and outer housings forming an annular space therebetween;

means for detachably mounting the second end of said inner housing to the second end of said outer housing;

an optical communication system mounted on said inner housing at its first end and having at least one opening permitting the output laser beam to pass through to the exterior of said laser chamber, whereby said optical communication system may be pre-aligned by longitudinally positioning said outer housing and said optical communication system and inner housing may be removed as a module.

2. Apparatus as in claim 1 wherein said laser chamber is maintained at a subatmospheric level and wherein:

said adjustable mounting means sealingly mounts said outer housing to said laser chamber; and said detachable mounting means sealingly mounts the second end of the inner housing to the second end of the outer housing.

3. Apparatus as in claim 1 wherein said adjustable mounting means for said outer housing comprises a resilient ring sandwiched on one side by a first beveled surface fixed with respect to said laser housing around the opening through which said outer housing extends and on the other side by a second beveled surface on a ring releasably mounted to said laser chamber so that when said ring is tightened against said laser housing said resilient ring expands to tightly hold said outer housing with respect to said laser housing.

4. Apparatus as in claim 3 further comprising means for forming an outlet in the outer housing to permit the annular chamber between the inner and outer housings to be exhausted.

5. Apparatus as in claim 1 wherein said optical communication comprises a plurality of spaced discs having central aligned openings and mounted to the inner end of said inner housing, the first of said discs being exposed on one side to the atmosphere.

6. Apparatus as in claim 5 wherein said laser chamber is maintained at a subatmospheric level and wherein:

the outer housing has an opening permitting the annular space between the inner and outer housing to be exhausted;

said inner housing has at least one opening connecting the opposite side of said first disc to said annular chamber.

7. Apparatus as in claim 5 wherein said first housing has a plurality of passages for coolant fluid generally around the periphery of said discs, the size of said passages being selected to carry away the precise amount of heat generated at the particular disc with which they are associated.

8. Apparatus as in claim 7 wherein said apparatus further comprises:

inlet and outlet passages respectively providing flow to the inlet and outlet sides of said cooling passages to form a network of parallel cooling passages;

conduits connected to said inlet and outlet passages to carry cooling fluid to and from the series of discs at a point exterior the laser chamber.

9. Apparatus as in claim 8 wherein said circumferential cooling passages are formed by a continuous annular groove interrupted by a plate secured in a slot in line with said grooves, each of said discs having axially directed passages in line with the inlet and outlet passages.

10. Apparatus as in claim 8 further comprising:

an element secured to said discs and having an opening first in line to receive the output laser beam, said element having thermocouple junctions imbedded in it;

connecting wires leading from said thermocouples through the annular space through the means connecting the inner housing to the second end of the outer housing to the exterior of said annular space.

11. Apparatus as in claim 3 further comprising:

a sleeve releasably secured to said laser chamber and having an outer diameter received in the opening in said laser housing and an inner diameter piloting said outer housing, said first beveled surface being formed on the end of said sleeve that is exterior to said laser chamber, said ring being releasably mounted to said sleeve.

* * * * *